United States Patent Office 3,672,828
Patented June 27, 1972

3,672,828
QUICK CURE PROCESS FOR MAKING SUPER-PHOSPHATES OF LOW FLUORINE CONTENT
Albert E. Henderson, Jr., 4308 Plaza Gate Lane,
Apt. 101, Jacksonville, Fla. 32217
Continuation-in-part of application Ser. No. 688,928, Dec. 7, 1967, now Patent No. 3,519,387, dated July 7, 1970. This application Feb. 3, 1970, Ser. No. 8,306
The portion of the term of the patent subsequent to July 7, 1987, has been disclaimed
Int. Cl. C01b 7/22, 25/32; C05l 1/00
U.S. Cl. 23—109         9 Claims

ABSTRACT OF THE DISCLOSURE

A method of making a quick cure low fluorine superphosphate by simultaneously and separately heating phosphate rock and mineral acid and then bringing the heated rock and acid together with rapid agitation to react the two to release fluorine and form a superphosphate product.

---

This application is a continuation in part of my copending application Ser. No. 688,928 filed Dec. 7, 1967, now Pat. 3,519,387, issued July 7, 1970.

This invention relates to a quick cure process for making superphosphates of low fluorine content and particularly to a method of making triple or concentrated superphosphates of low fluorine content without a prolonged holding or aging period.

Superphosphates are generally produced by reacting ground phosphate rock with a mineral acid in the proper proportions. When sulphuric acid is the source of acidulant, single superphosphate is produced, resulting in a product which contains approximately 20% available phosphoric acid. When prosphoric acid (orthophosphoric acid) ($H_3PO_4$) is the acidulant, triple or concentrated superphosphate is produced. The latter product contains approximately 46% available phosphoric acid. Intermediate superphosphates are produced by using various mixtures of sulphuric and phosphoric acids. Other mineral acids, such as nitric and hydrochloric acids, have been used to a very limited extent.

No matter which acidulant is used, the chief aim is to convert phosphate rock (generally apatite in composition and principally fluo-apatite) to monocalcium phosphate, which is the predominant chemical form of available phosphoric acid in various superphosphates.

Most phosphate rocks contain considerable amounts of fluorine. When these rocks are reacted with various mineral acids to produce superphosphates, generally between 10% and 30% of the fluorides present in the raw materials are released and must be subsequently removed, usually scrubbed in water, to avoid air pollution.

While single and intermediate superphosphates continue to evolve fluorides during curing and storage, the degree is less than in triple superphosphate. In the latter case, serious air pollution problems result and producers are currently considering the difficult task of scrubbing the gases vented from very large storage and curing sheds common in the phosphate industry.

The triple superphosphate now produced by the industry with wet process phosphoric acid and Florida phosphate rock analyses about 2.4–2.6 percent fluorine (dry basis) and evolves approximately 0.6 pound of fluorine per ton of product per day. This evolution rate is the average for the first 24 hours after manufacture and continues at a decreasing rate for at least several weeks.

I have found in my research that if the residual fluorine in the product can be reduced to below about 2.0 percent (dry basis), the evolution of fluorine is drastically reduced immediately and reaches essentially zero at about 48 hours. The use of furnace grade phosphoric acid in place of wet process acid will, of course, lower the starting fluorine level, however, the cost is considerably higher and as a result furnace acid is not generally used in superphosphate manufacture.

The need for a process by which superphosphates can be produced with the maximum elimination of fluorides and the minimum of storage has long been recognized in order to eliminate or reduce the problem of fluoride evolution during storage. No process has, however, been available which successfully accomplishes this purpose.

Producers of superphosphate have long recognized that the problems of fluorine control and of acid mixing were closely related and that the mixing of phosphate rock and acid must be carried out under well defined conditions to avoid producing products which cannot be adequately handled or which contain large percentages of unavailable forms of phosphate which will not cure to available form.

I have discovered a method of producing superphosphates which markedly reduces the fluorine level of the superphosphate product and eliminates the need for scrubbing the off gases from curing and storage buildings in order to comply with normal state emission regulations.

I have discovered a method of producing both single and triple superphosphates which substantially eliminates the problems of extended storage and of fluorine evolution on storage and which produces available forms of phosphate which can be subsequently ammoniated to suitable bases and granular products.

The process of this invention depends upon the reaction of hot acid and hot phosphate rock to produce superphosphate of substantially lower fluorine content than that presently available. The resulting product is substantially free of fluorine evolution from product storage. This invention can also be used to produce wet process phosphoric acid with a substantially lower fluorine content than that produced by conventional processes.

Preferably I provide a method of making superphosphate which comprises separately heating phosphate rock and reaction acid, admixing the heated rock and heated acid with agitation. Preferably the acid is heated to a temperature in the range 190° to 230° F. and the rock is heated to a temperature such that the combined heat input of acid and rock is sufficient to reduce the fluorine residual below 2.0% in the product. Higher temperature of about 500° F. and about 200° F. for the rock and acid respectively are preferred. The resulting product may be denned at elevated temperature up to about 400° F. for up to 30 minutes. The resulting product is treated by any of the known methods for recovery of superphosphate. For example, the product may be crushed and cooled or cooled and crushed and is ready for immediate shipment without long storage periods previously necessary for elimination of residual fluorine.

This hot method generally produces a granular product which can be screened and sized to produce a suitable granular superphosphate or crushed to produce a run-of-pile superphosphate. When single superphosphate is produced, the product can be leached to produce, without further concentration, 48% or greater strength phosphoric acid (as $P_2O_5$) with a fluoride content varying between 0.05% and 0.15% F.

I have found that the heat input required to reduce the residual fluorine to 2.0 percent is dependent upon the quantity of fluorine in the raw materials. The heat input required for any input fluorine level can be calculated as follows:

(A) Calculate the weight of fluorine input in acid and rock per pound of product.
(B) Using final moisture level calculate weight of fluorine to be removed to reach 2.0 percent residual fluorine on a dry basis.
(C) Divide this fluorine weight by $8 \times 10^{-5}$ lb. F removed per B.t.u. input.

In the foregoing general description I have set out certain objects, purposes and advantages of my invention. Other objects, purposes and advantages will be apparent from a consideraton of the following description and examples and the accompanying drawings in which.

Figure 1:
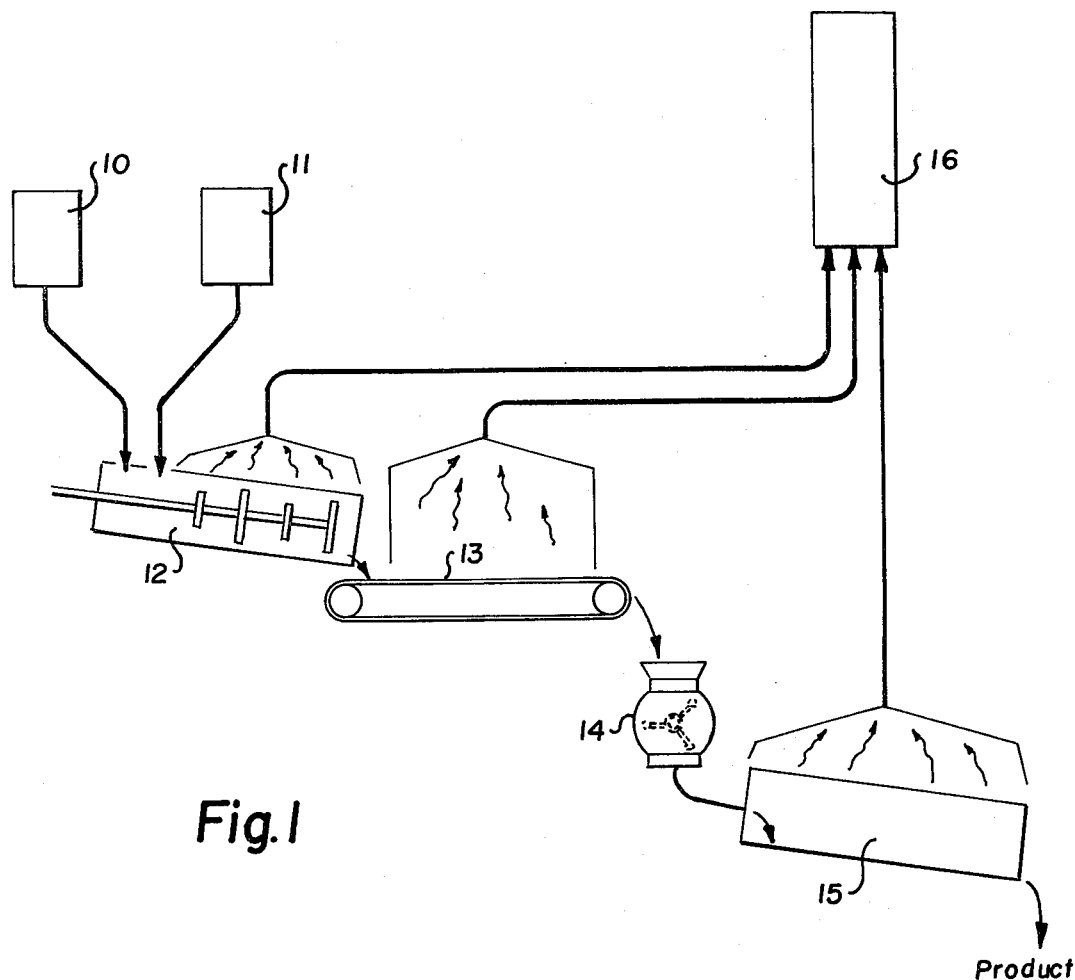
FIG. 1 is a flow diagram for a preferred practice of my invention.

Referring to the drawings I have illustrated a hot acid supply 10 and a hot rock supply 11, both feeding into a high speed pug mill mixer 21. The mixer 12 discharges onto a curing or setting belt 13 on which the product is denned. The belt 13 discharges to a pulverizer 14 which in turn discharges to a cooler 15. The product from cooler 15 is ready for storage, shipment or further processing.

All gases from the pug mill 12, the belt 13 and cooler 14 are carried to scrubber 16 for removal of fluorides.

EXAMPLE I

The practice of my invention was applied to Florida phosphate rock using various levels of acidulation based upon the general reaction $$Ca_{10}(PO_4)_6F_2 + 14H_3PO_4 \rightarrow 10CaH_4(PO_4)_2 + 2HF$$

The foregoing reaction assumes fixed values for the phosphate rock, represented as $Ca_{10}(PO_4)_6F_2$. Side reactions were ignored. Based on this, 100% acidulation is realized when the stoichiometric amount of phosphoric acid is used to convert all of the CaO in the rock to monocalcium phosphate.

The phosphate rock used contained 34% $P_2O_5$, 49% CaO, and 1% $H_2O$. Furnace grade phosphoric acid (86% $H_3PO_4$) was used as acidulant.

200 grams of rock was used in each of the six acidulations with varying amounts of acid. 200 grams of rock containing 49% CaO has 98.64 grams of CaO, requires 241.32 grams of 100% $H_3PO_4$, or 280.6 grams of 86% $H_3PO_4$. Thus 100% acidulation requires 200 grams of rock + 280.6 grams of 86% $H_3PO_4$. The six acidulations are represented as follows:

TABLE I (1) 12.5% acidulation: 200 g. rock + 35.075 g. 86% $H_3PO_4$ 25.0% acidulation: 200 g. rock + 70.15 g. 86% $H_3PO_4$ 50.0% acidulation: 200 g. rock + 140.30 g. 86% $H_3PO_4$ 75.0% acidulation: 200 g. rock + 210.45 g. 86% $H_3PO_4$ 100.0% acidulation: 200 g. rock + 280.60 g. 86% $H_3PO_4$ 125.0% acidulation: 200 g. rock + 350.75 g. 86% $H_3PO_4$ (2) In addition to rock and acid each acidulation contained six grams of Celite (diatomaceous earth).
(3) Mixing was accomplished in a high speed mixer.
(4) The 86% $H_3PO_4$ was preheated to 300° F.+ and added to rock which had been preheated to approximately 650° F.
(5) The six grams of Celite was added to the hot acid prior to mixing of the rock and acid.
(6) Hot acid was added to the hot rock during rapid mixing in periods of 15–30 seconds and mixing continued for approximately 15 seconds.
(7) A sample of the reaction mixture was immediately transferred to a glass beaker and placed in an oven (denned) for 45 minutes at 400° F. The sample was then cooled and stored in an open glass jar overnight. Analysis was made immediately following overnight storage. Fluorine evolution was noted during reaction period, during oven denning, and during the cooling period. Results of these acidulations are listed in Table II.

TABLE II

Phosphate rock: 34% $P_2O_5$, 49% CaO, 4% F, 1% $H_2O$, 3% $CO_2$.
All acidulations with 200 grams of rock Phosphoric acid: 86% $P_2O_5$, reagent grade

| Wt. of acid, g. | Percent acidulation | TPA | IPA | APA | WSPA[1] | CaO | F | $H_2O$ |
|---|---|---|---|---|---|---|---|---|
| 35.075 | 12.5 | 38.8 | 20.4 | 18.4 | 7.00 | 43.8 | 3.6 | 0.3 |
| 70.150 | 25.0 | 43.0 | 15.4 | 27.6 | 13.7 | 39.0 | 2.7 | 0.4 |
| 140.30 | 50.0 | 50.0 | 10.4 | 39.6 | 30.5 | 32.6 | 1.9 | 0.5 |
| 210.45 | 75.0 | 53.8 | 5.6 | 48.2 | 43.5 | 26.5 | 1.2 | 0.9 |
| 280.60 | 100.0 | 57.0 | 2.1 | 54.9 | 50.7 | 23.5 | 0.8 | 1.4 |
| 350.75 | 125.0 | 58.5 | 1.5 | 57.0 | 54.3 | 19.8 | 0.2 | 1.1 |

[1] Extended denning periods of up to two hours for these acidulates lowered WSPA and formed glassy phosphates believed to be polyphosphates.

NOTE: TPA equals total phosphoric acid.
IPA equals insoluble phosphoric acid.
APA equals available phosphoric acid.
WSPA equals water soluble phosphoric acid.

TABLE III

| Percent acidulation | CaO, percent | F, percent | $CO_2$, percent | $H_2O$, percent | F (evolution) |
|---|---|---|---|---|---|
| 12.5 | 43.8 | 3.6 | 2.5 | 0.32 | 1.7 |
| 25.0 | 39.0 | 2.7 | 1.8 | 0.40 | 14.1 |
| 50.0 | 32.6 | 1.9 | 1.2 | 0.5 | 29.7 |
| 75.0 | 26.5 | 1.2 | 0.8 | 0.9 | 44.6 |
| 100.0 | 23.5 | 0.8 | 0.3 | 1.4 | 57.0 |
| 125.0 | 19.8 | 0.2 | 0.2 | 1.1 | 88.8 |

$$\text{Percent Fluorine Evolution} = 1 - \frac{F_s Ca_r}{F_r Ca_s} \times 100$$

Where:

$F_s$ = percent fluorine in product
$F_r$ = percent fluorine in rock
$Ca_r$ = percent calcium in rock
$Ca_s$ = percent calcium in product This assumption is based on 100% acidulation and conversion of all CaO to $CaH_4(PO_4)_2$; accordingly, 241.82 grams of 100% $H_3PO_4$ releases 6.684 grams of F. Since there was 8.0 grams of F present in the 200 grams of rock then 100% acidulations should release $$\frac{6.684}{8.0} \times 100 = 83.55\% \text{ F}$$

present in the rock. On this basis then 100% acidulation represents only 83.55% F evolution.

A single superphosphate prepared under semi-plant conditions, using 96% $H_2SO_4$, gave 51% F evolution with low moisture of 3.96%.

Producers of superphosphate have long recognized that the mixing of acid and rock must be carried out under well defined conditions, otherwise products are produced which cannot be adequately handled in plants, which contain large percentages of unavailable phosphates, which will not cure to available forms and which cannot be subsequently ammoniated to suitable bases and granular goods. Accordingly, I made various tests using the hot rock, hot concentrated acid technique, but varying conditions of mixing.

Several acidulations were made using the procedure followed in Table I but with the following exceptions:

(a) One product was produced similar to acidulation No. 5 (100%) of Table I. The rock used varied slightly from that in Table I, the denning step was eliminated, and the rock and acid was not heated. The rock contained 49.6% CaO, 3.9% F, and 34.5% $P_2O_5$. The product produced contained 1.4% F which amounted to a fluoride evolution of approximately 22%. The moisture content was 9.2%.

(b) One product was produced following identical procedure as in test (a) but substituting wet process phosphoric acid (75%) containing 1.8% F. Flourine evolution from this product was approximately 25% and fluoride content was 2.0% F at 10.6% moisture.

Using the same general methods of acidulation, a number of products were produced in which only physical conditions and fluoride contents were observed.

(1) Using hot acid and hot rock for 100% acidulation basis single superphosphate and continuing mixing 12 seconds after acid addition a physically satisfactory product was produced containing 0.8% F and 2.8% $H_2O$. This represents 65 to 70% evolution.

(2) Using same procedure as in (1) above but using Formula No. 5 from Table II with 75% wet process $H_3PO_4$ being substituted for 86% reagent grade $H_3PO_4$ a product was obtained which had satisfactory physical condition and contained 1.2% F or about 0.8% less F than the product produced under same conditions without preheating acid and rock.

(3) Other batches of 15 to 20 lbs. of product were produced in a standard Pony mixer.
    (a) Hot acid-hot rock acidulate product containing 0.7% F and 4.2% $H_2O$ (100% triple formula from Table I). Original rock contained 4.1% F.
    (b) Same as (a) but product contained 0.8% F and 4.8% $H_2O$.

A number of other acidulates were made via same method as used in Table I but extending the mixing time after acid addition to 45 and 60 seconds. The material became very plastic and upon cooling was extremely dense. The only way that product could be removed from mixing equipment was to soak in water for several hours. This procedure was repeated and product dumped from mixing bowl before cooling. Later the dense product was ground and found to contain 1.3% F at 10.7% moisture.

The product (a) listed above as a result of hot acid-hot rock acidulation, 15 lb. batch, 0.7% F and 4.2% $H_2O$ did not foam vigorously. The product as discharged, by dumping from the Pony mixer, remained free flowing at all times and after about one minute of cooling ceased to evolve fluorine. The material did not become hard after remaining in an open drum overnight. These results were also reproduced in small scale kitchen mixer acidulation for several runs although the lowest fluoride content was 0.9% F.

An example of the calculation to determine heat input using a datum base of 80° F. is as follows:

Basis (one pound of product):
  Phosphate rock used: 33.8% $P_2O_5$, 3.9% F
  Phosphoric acid used: 52.9% $P_2O_5$, 1.2% F Quantities required:
  Rock = 0.392 pound
  Acid = 0.670 pound
    1.062 pounds input
    0.062 pound loss as $SiF_4$ and $H_2O$ during acidulation
    1.000 pound of product Specific heats:
  Rock = 0.25 B.t.u./lb.—° F.
  Acid = 0.38 B.t.u./lb.—° F.
Rock at 200° F.
Acid at 225° F.

Calculation:
  Heat input with rock = 0.392 lb.
    ×0.25 B.t.u./lb.—° F.×(200−80)° F. = 11.8 B.t.u.
  Heat input with acid = 0.670 lb.
    ×0.38 B.t.u./lb.—° F.×(225−80)° F. = 36.9 B.t.u.
  Total heat input = 11.8 B.t.u.
                    +36.9 B.t.u. = 48.7 B.t.u.

Figure 2:
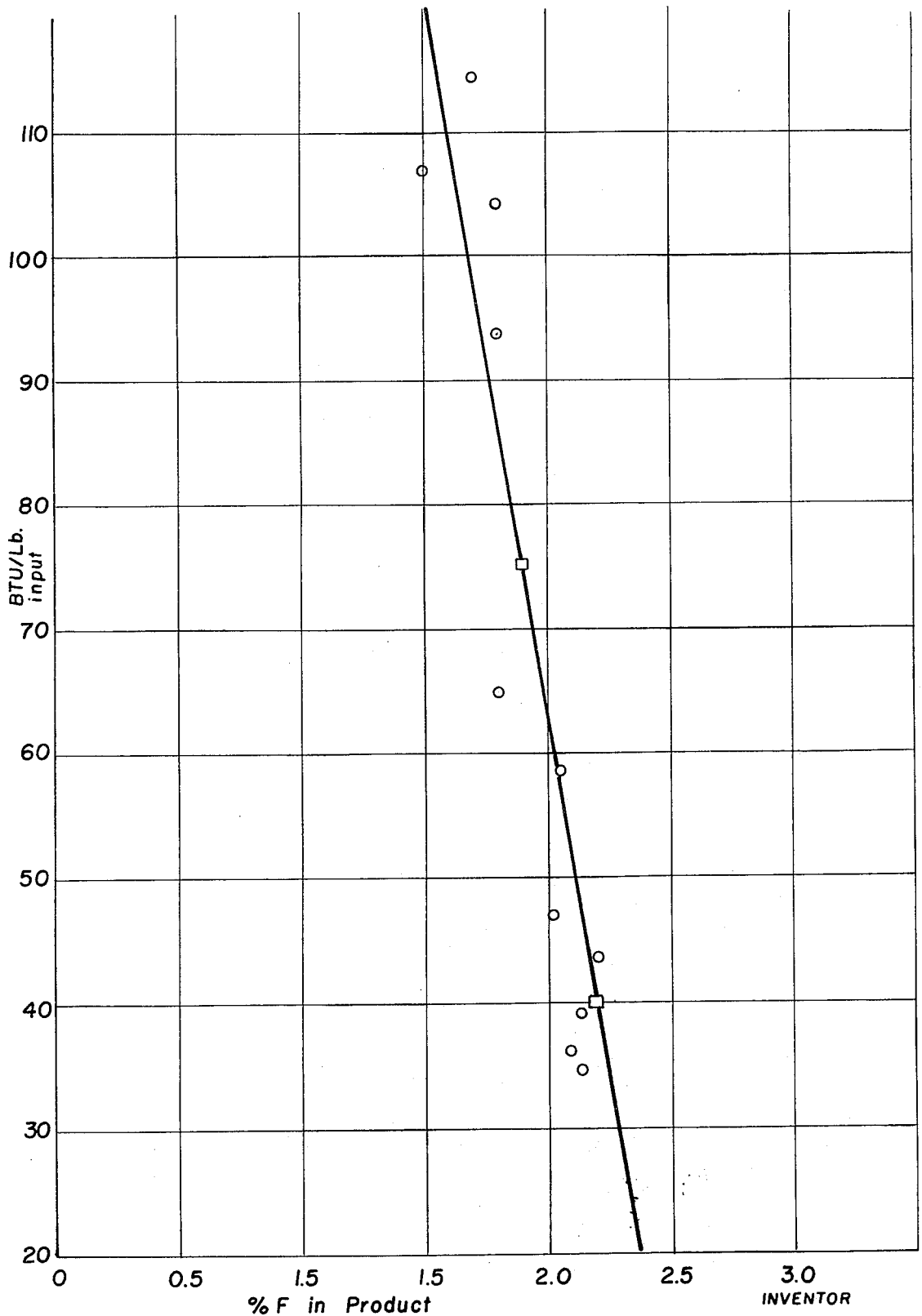
FIG. 2 is a graph showing the percent fluorine in product per B.t.u. pound input.

FIG. 2 presents a graph of data from laboratory tests shown at B.t.u./pound of product versus the residual fluorine in the product. A computer curve fitting program was used to locate the best curve for the data. These data were developed using the same rock and acid used in the previous example. Using these raw materials, a heat input of about 63 B.t.u./pound was required to reduce the residual fluorine to below 2.0 percent.

Obviously, as I have previously pointed out, the heat input required to reduce the residual fluorine to 2.0 percent is dependent on the quantity of the fluorine in the raw materials. Examination of FIG. 2 shows that each B.t.u. of heat added reduces the residual fluorine by $8 \times 10^{-5}$ lb./lb. of product. The heat input required for any input fluorine level is calculated as follows:

(A) Calculate weight of fluorine input in acid and rock per pound of product.
(B) Using final moisture level (this is dependent on temperature of reaction achieved and may require trial and error solution but typically will average about six percent), calculate weight of fluorine to be removed to reach 2.0 percent residual fluorine dry basis.
(C) Divide this weight by $8 \times 10^{-5}$ lb. F removed per B.t.u. input to determine required heat input.

An example of a calculation using the foregoing steps, using as a basis the same rock as in the example immediately above with an acid containing 1.5% F instead of 1.2%, one gets the following result.

(A) Weight of fluorine in raw materials:
  Rock = 0.392 lb. rock/lb. product
    ×0.039 lb. F/lb. rock = 0.015 F/lb. product
  Acid = 0.670 lb. acid/lb. product
    ×0.015 lb. F/lb. acid = 0.010 lb. F/lb. product.
  Total F input = 0.015 + 0.010
                   = 0.025 lb. F/lb. product.
(B) Final moisture = 6.0 percent So 2.0 percent dry basis =

$$2.0 \times \left(\frac{100-6}{100}\right)$$

= 1.9 percent wet basis or 0.019 lb. F/lb. product. Therefore, fluorine to be removed = 0.025 − 0.019 = 0.006 lb. F/lb. product.
(C) Heat input required = 0.006 lb. F/lb. product ÷ $8 \times 10^{-5}$ lbs. F/B.t.u. = 75 B.t.u./lb. product.

For this process a rapid and efficient mixing machine such as a high speed pug mill should be employed. The reaction should preferably be completed in less than 30 seconds, and preferably faster, from the time of acid contact with rock.

Rock should be preferably continuously heated to temperatures between 500 and 850° F. and contacted in a high speed mixer with acid preferably preheated to 250° F.+. The material is preferably discharged directly to a combination setting belt-den which maintains temperatures at desired conditions depending on product produced. The den can be heated to desired temperatures from off gases from the rock heating operation so that additional heat is not required. Denning temperatures and time may vary from 0 to 30 minutes and product temperature to 400° F. depending on product.

The product is crushed and discharged to a rotary cooler or cooled and then crushed, as desired, depending on product.

The product as discharged from the cooler is ready for shipment or direct integration into a granular fertilizer system. Hydrochloric acid and nitric acids can replace part of the phosphoric or sulphuric acids used in the discussion. Replacement of as much as 50% of sulphuric and phosphoric acids in above mentioned tests with HCl and $HNO_3$ caused only minor differences in fluorine evolution. Pilot plant runs (approximately 300 #/hr.) using a high speed pug mill in a continuous system gave greater fluoride evolution than was indicated by batch studies. Apparently high speed continuous processing provides conditions which further enhances fluorine evolution.

The advantages of this invention can be summarized as follows:

(1) Substantially reduces the flourine content of products and eliminates fluorine evolution from product storage. This solves a serious air pollution problem in current processes for triple superphosphate production.

(2) Produces a product ready for immediate shipment and/or use in other processes. This eliminates the long storage periods required in current processes.

(3) Produces a product which when subsequently ammoniated contains appreciably greater available $P_2O_5$ when the method used for available $P_2O_5$ is the alkaline citrate method as opposed to the neutral ammonium citrate method. The reason for this is that on ammoniation significant amounts of the water insoluble $P_2O_5$ is in the dicalcium phosphate form rather than fluorapatite, a significant by-product of current ammoniated superphosphates.

(4) Contains considerably less crop damaging fluorides.

(5) Produces a product which can readily be granulated if the cooling state is by-passed. The high temperature of this product reduces the amount of steam required in granulation.

(6) Produces a product which, because of its high temperature and low moisture content, can be introduced directly into production of such products as nitrophos with considerable reduction in recycle requirements for granulated materials.

(7) Produces a product which can be leached to produce a low flouride content 48% or greater strength wet process phosphoric acid without a concentation step.

Use of hot acid, hot rock and very rapid reaction, under controlled reaction bed conditions, reduces the plastic phase normally encountered in superphosphate production—this makes possible fluoride evolution from a free flowing relatively drier bed and provides excellent mixing conditions as well as horsepower reduction. This is a key concept of the process. While the use of Celite as an aid to fluoride evolution has previously been reported, there was reasonable evidence that it is not necessary when both acid and rock are heated. Several acidulations were made in which the Celite was not included in formulation with no noticeable difference in fluoride evolution.

While I have illustrated and described certain presently preferred practices of my invention in the foregoing specification, it will be understood that this invention may be otherwise embodied within the scope of the following claims.

I claim:

1. A method of producing a quick cured superphosphate substantially free of subsequent fluorine evolution comprising the steps of:
  (a) simultaneously and separately heating phosphate rock and a mineral acid to a combined B.t.u. level sufficient to reduce the fluorine residual in the product below 2.0%, and
  (b) bringing the heated phosphate rock and mineral acid together with agitation to react the two together to release volatile fluorides and form a superphosphate product.

2. The process of claim 1 wherein the superphosphate product is denned at elevated temperatures up to about 400° F. for a short period of time up to about 30 minutes.

3. The process of claim 1 wherein the heated mineral acid is selected from the group consisting of phosphoric acid, sulphuric acid, hydrochloric acid, nitric acid and mixtures thereof.

4. The process of claim 1 wherein the phosphoric acid is heated to a temperature between about 190° F. to 230° F.

5. The proces of claim 1 wherein the phosphate rock is heated to a temperature in the range 500° F. to 900° F. and the acid is heated to a temperature above about 200° F.

6. The process of claim 1 wherein the mixture of heated phosphate rock and heated acid are rapidly agitated for about 15 to 60 seconds.

7. The process of claim 6 wherein the product after agitation is denned at a temperature of 200° F. to 400° F. for up to 30 minutes.

8. The process of claim 6 wherein the product after agitation is cooled and crushed.

9. The process of claim 6 wherein the product is leached to produce without further concentration, a low fluoride 48% or greater wet process phosphoric acid.

References Cited
UNITED STATES PATENTS 3,519,387    7/1970    Henderson, Jr. _____ 23—109

OSCAR R. VERTIZ, Primary Examiner

H. S. MILLER, Assistant Examiner

U.S. Cl. X.R.

23—153; 71—33